United States Patent
Liu et al.

(10) Patent No.: US 10,819,220 B2
(45) Date of Patent: Oct. 27, 2020

(54) DISPLAY DEVICE AND OVER-VOLTAGE PROTECTION METHOD

(71) Applicant: Hisense Visual Technology Co., Ltd., Qingdao, Shandong (CN)

(72) Inventors: Haifeng Liu, Shandong (CN); Hongbo Chi, Shandong (CN); Kuanzhi Gao, Shandong (CN); Wentao Han, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/796,437

(22) Filed: Feb. 20, 2020

(65) Prior Publication Data
US 2020/0304015 A1 Sep. 24, 2020

Related U.S. Application Data

(63) Continuation of application No. PCT/CN2020/072400, filed on Jan. 16, 2020.

(30) Foreign Application Priority Data

Mar. 19, 2019 (CN) .......................... 2019 1 0206356

(51) Int. Cl.
*H02M 3/335* (2006.01)
*H02M 1/42* (2007.01)
(Continued)

(52) U.S. Cl.
CPC .......... *H02M 1/32* (2013.01); *H02M 3/33569* (2013.01); *H02M 1/4208* (2013.01);
(Continued)

(58) Field of Classification Search
CPC .......... H02M 3/33523; H02M 3/33553; H02M 3/33561; H02M 1/4241
(Continued)

(56) References Cited

U.S. PATENT DOCUMENTS 6,018,467 A * 1/2000 Majid ............... H02M 3/33523
363/16
2012/0025720 A1* 2/2012 Chen ..................... H02M 3/337
315/185 R
(Continued)

FOREIGN PATENT DOCUMENTS

CN 102222490 A 10/2011
CN 203289702 U 11/2013
(Continued)

OTHER PUBLICATIONS

ISA State Intellectual Property Office of the People's Republic of China, International Search Report Issued in Application No. PCT/CN2020/072400, dated Apr. 22, 2020, WIPO, 4 pages.

*Primary Examiner* — Gary A Nash
(74) *Attorney, Agent, or Firm* — Brinks Gilson & Lione (57) ABSTRACT

The present application is directed to a display device and an over-voltage protection method. As an example, the display device includes a power source assembly and an electric load. The power source assembly includes an LLC circuit, a transformer and a feedback circuit. An input end of the transformer is connected with a control end of the LLC circuit, a first output end of the transformer is connected with a supply end of the LLC circuit, a second output end of the transformer is connected with the electric load, and the transformer is configured to supply power to the LLC circuit and the electric load. A first end of the feedback circuit is connected with the second output end of the transformer, a second end of the feedback circuit is connected with the feedback end of the LLC circuit and the feedback circuit is configured to supply a voltage derived from the second output end of the transformer to the LLC circuit. The LLC circuit is configured to stabilize a voltage supplied by the second output end of the transformer to the electric load
(Continued)

based on the feedback voltage supplied by the feedback circuit.

10 Claims, 6 Drawing Sheets

(51) Int. Cl.
  *H02M 1/32*   (2007.01)
  *H02M 1/44*   (2007.01)
(52) U.S. Cl.
  CPC .......... *H02M 1/44* (2013.01); *H02M 3/33523* (2013.01); *H02M 3/33553* (2013.01); *H02M 3/33561* (2013.01)
(58) Field of Classification Search
  USPC ................................ 363/21.02, 21.08, 21.16
  See application file for complete search history.

(56) References Cited

U.S. PATENT DOCUMENTS

| | | | | |
|---|---|---|---|---|
| 2012/0250360 | A1* | 10/2012 | Orr ..................... | H02M 3/3376 |
| | | | | 363/21.02 |
| 2015/0091460 | A1* | 4/2015 | Kato et al. .............. | H02M 1/32 |
| | | | | 315/200 R |
| 2016/0141951 | A1* | 5/2016 | Mao ........................ | H02M 1/36 |
| | | | | 363/21.02 |
| 2016/0141964 | A1* | 5/2016 | Yu .......................... | H02M 1/36 |
| | | | | 363/21.02 |
| 2017/0231041 | A1* | 8/2017 | Yang ....................... | H05B 45/37 |
| 2017/0310224 | A1* | 10/2017 | Joo ....................... | G09G 3/3406 |

FOREIGN PATENT DOCUMENTS

| | | |
|---|---|---|
| CN | 103813595 A | 5/2014 |
| CN | 106356179 A | 1/2017 |
| JP | 2005318050 A | 11/2005 |

* cited by examiner

DISPLAY DEVICE AND OVER-VOLTAGE PROTECTION METHOD

CROSS REFERENCE TO RELATED APPLICATIONS

This application is a continuation application of International Application No. PCT/CN2020/072400 filed on Jan. 16, 2020, which claims priority to Chinese Patent Application No. 201910206356.3 filed on Mar. 19, 2019, the entire content of which is incorporated herein by reference.

TECHNICAL FIELD

The present disclosure relates to electronic device technologies, and in particular to a display device and an over-voltage protection method.

BACKGROUND

Along with scientific and technological development and increasing demands of users, there are more and more electronic display devices in the houses of the users, which provide all-around convenience and entertainment for users. However, along with the technological development, power source control gradually entered into a digital control era from an analog control and an analog-digital hybrid control, which requires increasingly high stability for power source. Thus, there is a need to provide a stable power source.

SUMMARY

According to a first aspect of some embodiments of the present disclosure, a display device is provided. The display device includes an electric load and a power source assembly. The power source assembly includes an LLC circuit, a transformer and a feedback circuit. The LLC circuit includes a control end, a supply end and a feedback end. The transformer includes an input end, a first output end, and a second output end. The input end of the transformer is connected with the control end of the LLC circuit. The first output end of the transformer is connected with the supply end of the LLC circuit. The second output end of the transformer is connected with the electric load. The transformer is configured to supply power to the LLC circuit and the electric load. The feedback circuit includes a first end and a second end. The first end of the feedback circuit is connected with the second output end of the transformer, and the second end of the feedback circuit is connected with the feedback end of the LLC circuit. The feedback circuit is configured to provide a voltage derived from the second output end of the transformer to the LLC circuit. The LLC circuit is configured to stabilize the voltage supplied by the second output end of the transformer to the electric load based on the feedback voltage supplied by the feedback circuit.

According to a second aspect of some embodiments of the present disclosure, a display device is provided. The display device includes an electric load and a power source assembly. The power source assembly includes an LLC circuit, a transformer and a feedback circuit. The LLC circuit includes a control end, a supply end, and a feedback end. The feedback circuit includes a first end and a second end. The transformer includes an input end, a first output end and a second output end. The input end of the transformer is connected with the control end of the LLC circuit. The first output end of the transformer is connected with the first end of the feedback circuit and the supply end of the LLC circuit respectively. The second output end of the transformer is connected with the electric load. The transformer is configured to supply power to the LLC circuit and the electric load. The second end of the feedback circuit is connected with the feedback end of the LLC circuit. The feedback circuit is configured to supply a voltage of the first output end of the transformer to the LLC circuit. The LLC circuit is configured to stabilize the voltage supplied by the first output end of the transformer to the LLC circuit based on the feedback voltage supplied by the feedback circuit. The LLC circuit is further configured to control the LLC circuit to stop operating when a voltage received by the supply end is higher than a second preset working voltage. The first output end and the second output end of the transformer are at a same side of the transformer.

According to a third aspect of some embodiments of the present disclosure, an over-voltage protection method is provided. The method is applied to the display device according to the above second aspect. The display device includes a transformer, an electric load, a feedback circuit and an LLC circuit. The transformer is configured to supply power to the LLC circuit and the electric load. The over-voltage protection method includes: receiving a voltage supplied by the feedback circuit from the transformer, where the voltage is configured to indicate a voltage supplied by the transformer to the LLC circuit; adjusting the voltage of the first output end of the transformer based on the voltage supplied by the feedback circuit and a preset reference voltage; and controlling the LLC circuit to stop operating when the voltage supplied by the transformer to the LLC circuit is higher than the second preset working voltage, so that the transformer stops supplying power to the electric load and the LLC circuit.

BRIEF DESCRIPTION OF THE DRAWINGS

The accompanying drawings for facilitating illustration of various embodiments of the current disclosure are described briefly below. The drawings are merely exemplary embodiments of the present disclosure and other drawings may be derived by those of ordinary skill in the art based on these drawings without creative work.

DESCRIPTIONS OF NUMERALS

1—power source assembly, 2—electric load, 3—housing, 11—alternating current input circuit, 12—electromagnetic compatibility circuit 13—rectifying circuit, 14—PFC component, 15—LLC circuit, 16—transformer 17—feedback circuit, 18—control switch, 19—voltage stabilizing circuit, 20—over-voltage protection circuit, 21—display screen component, 22—backlight assembly

DETAILED DESCRIPTION OF THE EMBODIMENTS

Example embodiments are provided to convey the scope of this disclosure to those who are skilled in the art. Numerous specific details are set forth as examples of specific components, devices, and methods, to provide an understanding of the various embodiments of the present disclosure. It will be apparent to those skilled in the art that specific details are merely exemplary and are not required in a particular implementation, and that the these examples may be embodied in many different forms and should not be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 1:
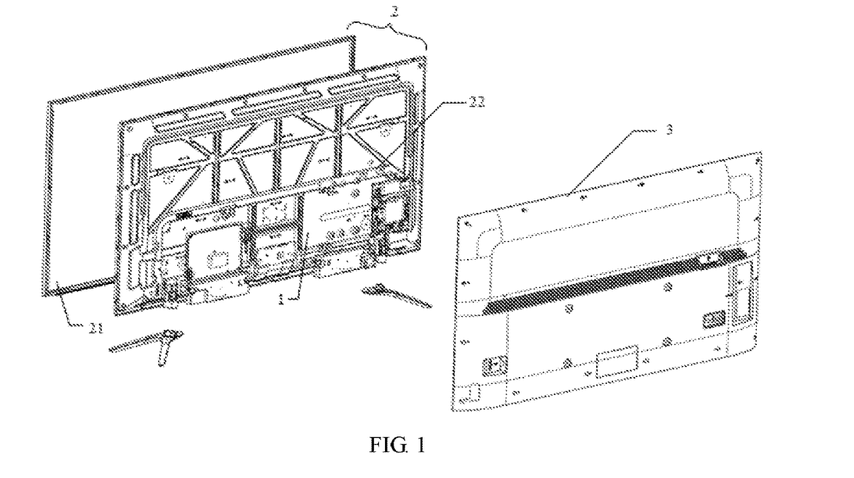
FIG. 1 is a schematic diagram illustrating a structure of a display device according to some exemplary embodiments.

FIG. 1 is a schematic diagram illustrating a structure of a display device. In FIG. 1, descriptions are made with a TV being an exemplary display device. As shown in FIG. 1, the TV includes a power source assembly 1, an electric load 2 of the power source assembly and a housing 3. The power source assembly 1 is configured to supply power to the electric load 2. The electric load 2 includes a display screen component 21 and a backlight assembly 22. The display screen component 21 is configured to present images to a user. The backlight assembly 22 generally includes some optical components which are behind the display screen component 21 and are configured to supply illumination of sufficient brightness and uniformity to the display screen component 21 for displaying images. The power source assembly 1 is mainly configured to receive utility power and convert the utility power to supply power to the backlight assembly 22. The housing 3 encloses components such as the display screen component 21, the backlight assembly 22 and the power source assembly 21 in the display device, thereby improving the aesthetic appearance.

In addition, the backlight assembly 22 further includes a back plate (not shown in FIG. 1) and the display device further includes a main board (not shown in FIG. 1). Generally, some convex hull structures are formed by stamping on the back plate. The main board and the power source assembly 1 are fitted in the convex hulls by screws or pawls. Various circuits are included in the main board and the power source assembly 1 to perform communication and control of electric signals.

The power source assembly 1 in the display device is configured to convert an alternating current power source supplied by a power grid into a direct current power source. The direct current power source is configured, on one hand, to supply power to the resonant conversion circuit (LLC circuit) in the power source assembly 1 and, on the other hand, to supply power to the electric load 2 in the display device.

At present, a transformer is disposed in the power source assembly 1 to output a plurality of types of voltages to the electric load, for example, output a 12V voltage to the main board, and a 18V voltage to an audio device. In this way, relevant functions of the display device are realized.

The circuits associated with the power source assembly are described below.

Figure 2:
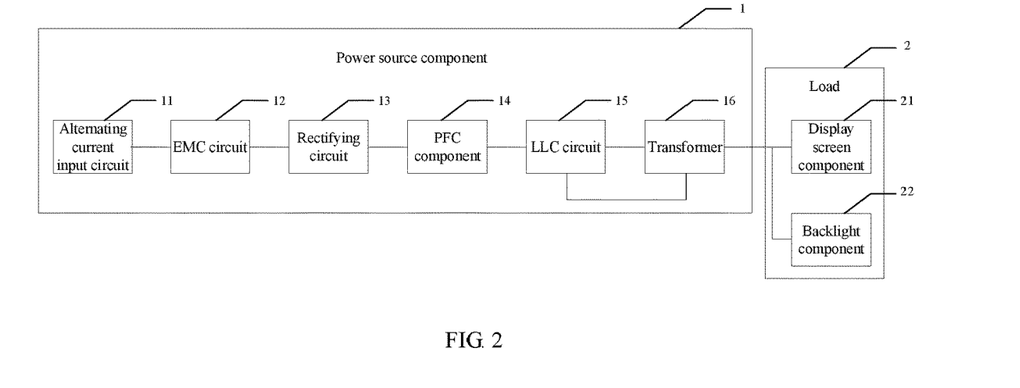
FIG. 2 is a schematic diagram illustrating a structure of a power source assembly of a display device according to a first embodiment of the present disclosure.

FIG. 2 is a schematic diagram illustrating a structure of a power source assembly of a display device according to a first embodiment of the present disclosure. In FIG. 2, the power source assembly 1 mainly includes an alternating current input circuit 11, an electromagnetic compatibility (EMC) circuit 12, a rectifying circuit 13, a power factor correction (PFC) component 14, a resonant conversion (LLC) circuit 15 and a transformer 16. The electromagnetic compatibility circuit 12 is configured to perform high frequency filtering for an input alternating current. The rectifying circuit 13 is configured to perform rectification for an input alternating current, to input a full wave signal to the PFC component 14. The PFC component 14 usually includes a PFC inductor, a switching power device, and a PFC chip, which is mainly configured to perform power factor correction for the input alternating current and output a stable direct current bus voltage (for example, 380V) to the LLC circuit 15. The PFC component 14 effectively improves the power factor of the power source and ensures the voltage and the current are in phase. The LLC circuit 15 performs bucking or boosting for the input direct current bus voltage and outputs a constant voltage to the transformer 16. In an exemplary embodiment, the LLC circuit 15 may adopt a double MOS transistor LLC resonant conversion circuit. Generally, a synchronous rectifying circuit may be disposed in the LLC circuit 15. The synchronous rectifying circuit mainly includes a transformer, a controller, two MOS transistors and a diode. Further, the LLC circuit 15 may include a pulse frequency modulation (PFM) circuit, a capacitor and an inductor and so on. Generally, the LLC circuit 15 output different types of voltages to satisfy the requirements of the electric load. The transformer 16 is configured to supply power to the electric load 2, for example, the display screen component 21 and the backlight assembly 22. Illustratively, the transformer 16 is further configured to supply power to the LLC circuit 15.

Figure 3:
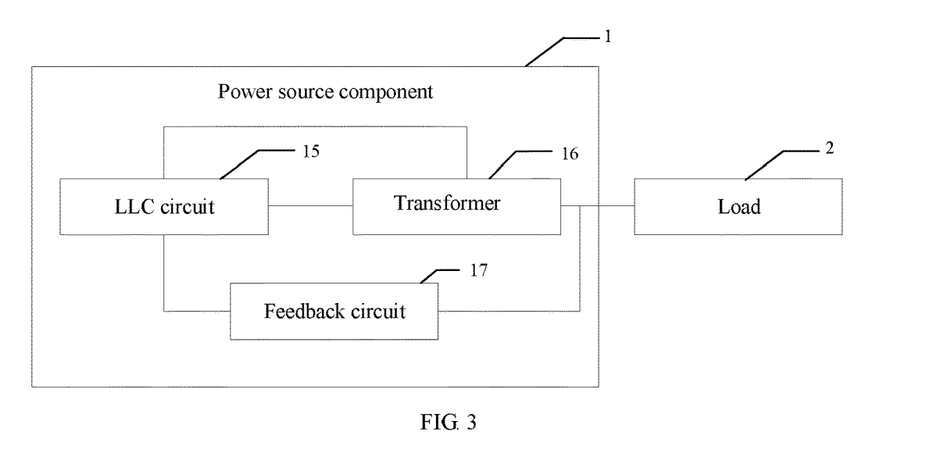
FIG. 3 is a schematic diagram illustrating a structure of a power source assembly of a display device according to a second embodiment of the present disclosure.

FIG. 3 is a schematic diagram illustrating a structure of a power source assembly of a display device according to a second embodiment of the present disclosure. In this embodiment, to ensure that the transformer 16 supplies a stable voltage to the electric load 2, as shown in FIG. 3, the power source assembly 1 further includes a feedback circuit 17.

The first output end of the transformer 16 is connected with the supply end of the LLC circuit 15, the second output end of the transformer 16 is connected with the first end of the feedback circuit 17 and the electric load 2, the second end of the feedback circuit 17 is connected with the feedback end of the LLC circuit 15, and the control end of the LLC circuit 15 is connected with the input end of the transformer 16.

The LLC circuit 15 is configured to stabilize the voltage supplied from the second output end of the transformer 16 to the electric load 2 based on the feedback voltage supplied by the feedback circuit 17.

Illustratively, in FIG. 3, the feedback circuit 17 is configured to adjust the output voltage of the second output end of the transformer 16 to ensure the voltage supplied by the transformer 16 to the electric load 2 is stabilized at a fixed voltage value denoted as a first preset working voltage, for example, 220V. Specifically, the feedback circuit 17 is configured to indicate/represent the output voltage supplied by the second output end of the transformer 16 to the LLC circuit 15. The LLC circuit 15 stores a preset reference voltage Vref denoted as a first preset reference voltage. The output voltage of the second output end of the transformer 16 is adjusted by comparing the voltage supplied by the feedback circuit 17 at the feedback end of the LLC circuit 15 with the first preset reference voltage, so that the voltage of the feedback end tracks the first preset reference voltage. Thus, the output voltage of the second output end of the transformer 16 is stabilized at the first preset working voltage to ensure that the display device functions normally.

In some embodiments, the feedback voltage received by the feedback end of the LLC circuit 15 is affected by a parameter of a device in the feedback circuit 17. The LLC circuit 15 stabilizes the output voltage of the second output end of the transformer 16 in the following manner.

Illustratively, when the output voltage of the second output end of the transformer 16 is 220V, the feedback voltage received by the LLC circuit 15 is 12V. In this case, the LLC circuit 15 stores a preset reference voltage as 12V. When the feedback voltage received by the LLC circuit 15 is greater than 12V, the voltage of the second output end of the transformer 16 is reduced. When the feedback voltage received by the LLC circuit 15 is smaller than 12V, the voltage of the second output end of the transformer 16 is increased. In this way, the output voltage of the second output end of the transformer 16 is stabilized.

The display device according to some embodiments of the present disclosure stabilizes the output voltage of the second output end of the transformer, by disposal of a feedback circuit between the second output end of the transformer and the LLC circuit, thereby ensuring that the display device functions normally.

Figure 4:
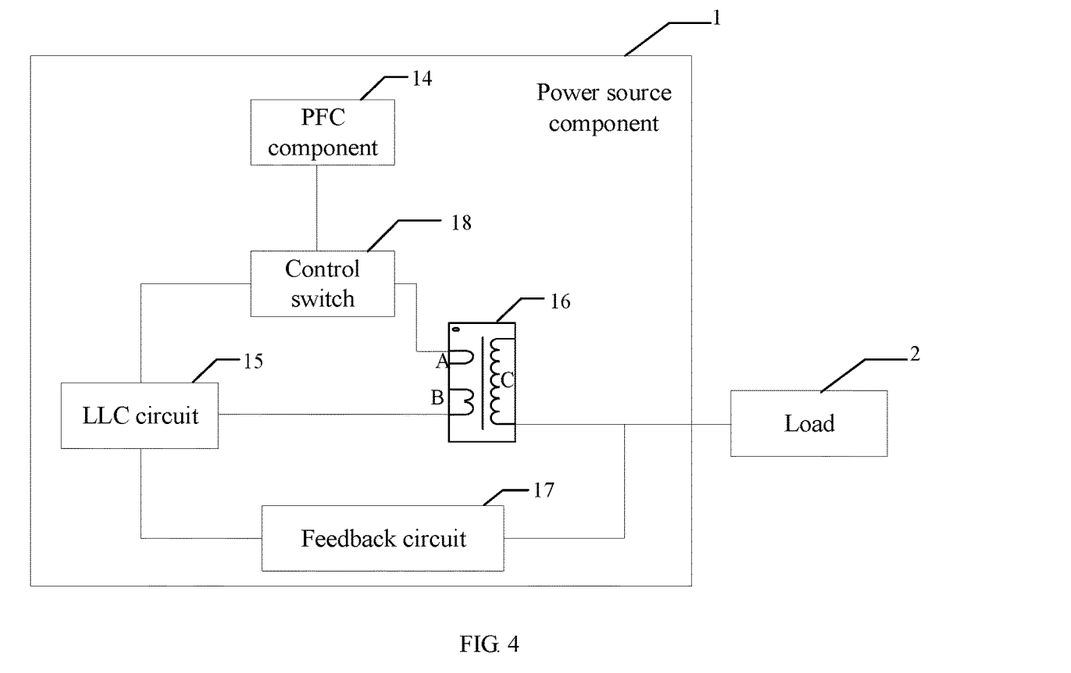
FIG. 4 is a schematic diagram illustrating a structure of a power source assembly of a display device according to a third embodiment of the present disclosure.

FIG. 4 is a schematic diagram illustrating a structure of a power source assembly of a display device according to a third embodiment of the present disclosure. As shown in FIG. 4, the power source assembly 1 further includes a control switch 18.

The control end of the LLC circuit 15 is connected with a control end of the control switch 18. A primary side winding of the transformer 16 is connected with a power source provided by the PFC component 14 through the control switch 18. The LLC circuit 15 is configured to adjust a working frequency of the LLC circuit 15 based on the feedback voltage supplied by the feedback circuit 17, so as to adjust the output voltage of the transformer 16.

Based on any above embodiment, to avoid mutual interference between the first output end and the second output end of the transformer 16, the first output end of the transformer 16 is disposed at a primary side of the transformer 16 and the second output end of the transformer 16 is disposed at a secondary side of the transformer 16. As shown in FIG. 4, the primary side winding A of the transformer is connected with the control switch 16, and the winding A serving as the input end of the transformer 16 is connected with the output end of the PFC component 14 through the control switch 18. A winding B is further disposed at the primary side of the transformer 16. The winding B serving as the first output end of the transformer 16 is connected with the supply end of the LLC circuit 15 to supply power to the LLC circuit 15. A winding C is further disposed at the secondary side of the transformer 16. The winding C serving as the second output end of the transformer 16 is connected with the electric load 2 to supply power to the electric load 2.

Here, when the LLC circuit 15 adjusts the output voltage of the second output end of the transformer 16 based on the feedback voltage supplied by the feedback circuit 17, the output voltage of the first output end of the transformer 16 is adjusted accordingly. Especially, when the first output end and the second output end of the transformer 16 are disposed at different sides of the transformer 16, any tiny change to the output voltage of the second output end of the transformer 16 will result in a large fluctuation of the output voltage of the first output end of the transformer 16, which further affects the stability of the voltage supplied by the first output end of the transformer 16 to the supply end of the LLC circuit 15.

Illustratively, when the transformer 16 is in operation, the PFC component 14 supplies a voltage of 380V to the input end of the transformer 16 through the control switch 18, and the second output end of the transformer 16 supplies a voltage of 220V to the electric load 2. The voltage supplied by the first output end of the transformer 16 to the supply end of the LLC circuit 15 is 18V, and the voltage supplied by the second output end of the transformer 16 to the feedback end of the LLC circuit 15 through the feedback circuit 17 is 12V. For example, when the output voltage of the second output end of the transformer 16 is reduced from 220V to 210V due to an increase of the electric load of the transformer 16, the voltage received by the feedback end of the LLC circuit 15 may be correspondingly reduced to 11.5V. When the LLC circuit 15 increases the output voltage of the second output end of the transformer 16 through the control switch 18 to 220V, the voltage supplied by the first output end of the transformer 16 to the supply end of the LLC circuit 15 may be correspondingly increased from 18V to 22V. The voltage of the first output end of the transformer 16 changes significantly, affecting the reliability of the power source.

Figure 5:
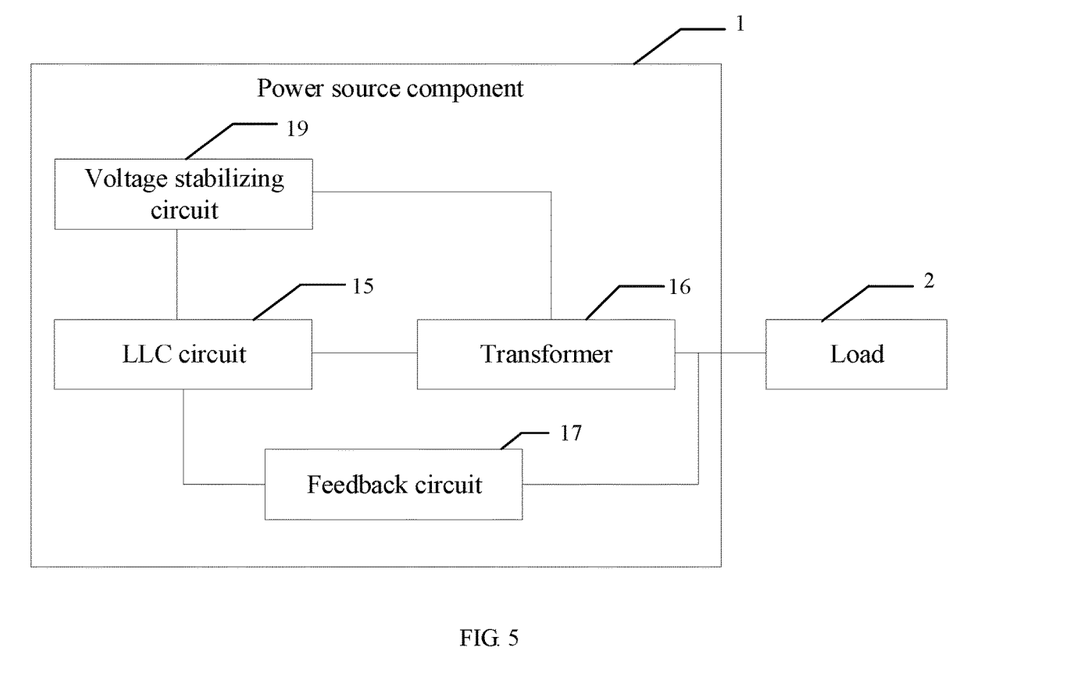
FIG. 5 is a schematic diagram illustrating a structure of a power source assembly of a display device according to a fourth embodiment of the present disclosure.

FIG. 5 is a schematic diagram illustrating a structure of a power source assembly of a display device according to a fourth embodiment of the present disclosure. The power source assembly 1 according to some embodiments includes a voltage stabilizing circuit 19 configured to stabilize the voltage supplied by the first output end of the transformer 16 to the supply end of the LLC circuit 15. As shown in FIG. 5, a first end of the voltage stabilizing circuit 19 is connected with the first output end of the transformer 16, and a second end of the voltage stabilizing circuit 19 is connected with the supply end of the LLC circuit 15. The voltage stabilizing circuit 19 is configured to stabilize the voltage supplied by the first output end of the transformer 16 to the LLC circuit.

In FIGS. 4 and 5, the input end and the first output end of the transformer 16 are disposed at the same side of the transformer 16. However, in FIG. 4, the input end of the transformer 16 is connected with the control end of the LLC circuit 15 through the control switch 18, and the first output end of the transformer 16 is directly connected with the supply end of the LLC circuit 15. In FIG. 5, the first output end of the transformer 16 is connected with the supply end of the LLC circuit 15 through the voltage stabilizing circuit 19, and the input end of the transformer 16 is directly connected with the control end of the LLC circuit 15.

At present, the control of the power source assembly has already advanced from an analog control or an analog-digital hybrid control manner to a digital control manner. With the digital control, the LLC circuit 15 provides a standby function, which becomes a new development trend. This standby function starts to be deployed widely in the industry. However, the LLC circuit 15 with the standby function requires a stable supply voltage to avoid excessively high temperature rise.

In some embodiments, in FIG. 5, the input end of the transformer 16 is connected with the control end of the LLC circuit 15, the first output end of the transformer 16 is connected with the supply end of the LLC circuit 15, and the second output end of the transformer 16 is connected with the electric load 2. The voltage stabilizing circuit 19 is disposed between the first output end of the transformer 16 and the supply end of the LLC circuit 15 to stabilize the voltage of the supply end of the LLC circuit 15. The voltage stabilizing circuit 19 may be a linear voltage stabilizing circuit so that the output voltage of the first output end of the transformer 16 remains stable after passing through the voltage stabilizing circuit 19, that is, the voltage input to the LLC circuit 15 will not increase abnormally. When the output voltage of the transformer 16 spikes due to abnormality occurring in the power source assembly 1, the spiky voltage would not affect the output voltage of the first output end of the transformer 16, thereby protecting the LLC circuit 15.

In the display device according to some embodiments of the present disclosure, by including the voltage stabilizing circuit between the first output end of the transformer and the supply end of the LLC circuit, the output voltage of the first output end of the transformer is stabilized while the output voltage of the second output end of the transformer is also stabilized. Thus, the high power source stability can be achieved.

At present, an over-voltage protection circuit is generally disposed in the LLC circuit 15. When the supply end of the LLC circuit 15 receives an excessively high voltage, the over-voltage protection is triggered/enabled. However, when a voltage stabilizing circuit is configured in the power source assembly 1 in FIG. 5, an over-voltage protection circuit disposed in the LLC circuit 5 may not respond because the supply end always receives a stable voltage. The power source assembly according to the above embodiments faces a problem that the over-voltage protection may be ineffective.

Figure 6:
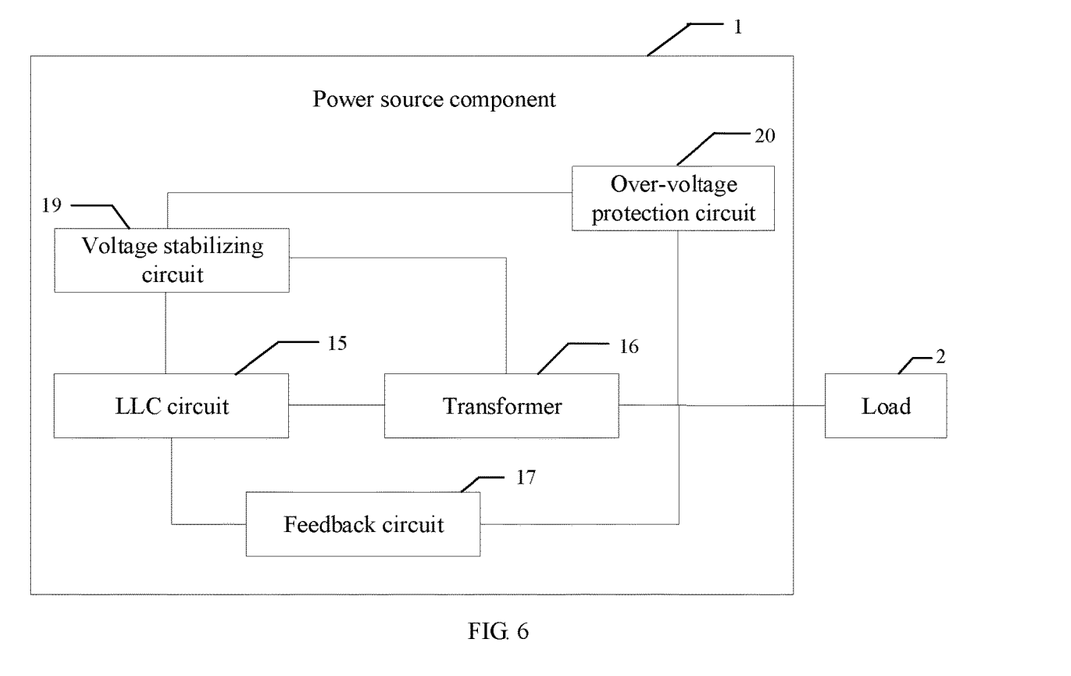
FIG. 6 is a schematic diagram illustrating a structure of a power source assembly of a display device according to a fifth embodiment of the present disclosure.

FIG. 6 is a schematic diagram illustrating a structure of a power source assembly of a display device according to a fifth embodiment of the present disclosure. Compared with the embodiment of FIG. 5, the power source assembly 1 in the embodiment further includes an over-voltage protection circuit 20, configured to provide over-voltage protection for the LLC circuit 15.

In FIG. 6, a first end of the over-voltage protection circuit 20 is connected with the second output end of the transformer 16, and a second end of the over-voltage protection circuit 20 is connected with the control end of the voltage stabilizing circuit 19.

The over-voltage protection circuit 20 is configured to send a control signal to the control end of the voltage stabilizing circuit 19 to control the voltage stabilizing circuit 19 to stop supplying power to the LLC circuit 15, when the voltage supplied by the second output end of the transformer 16 to the electric load 2 is higher than the first preset working voltage.

Illustratively, as shown in FIG. 6, the over-voltage protection circuit 20 is configured to provide over-voltage protection for the output voltage of the second output end of the transformer 16.

In some embodiments, the over-voltage protection circuit 20 is configured at the second output end of the transformer 16 to monitor the output voltage of the second output end of the transformer 16 in real time and determine whether the output voltage of the second output end of the transformer 16 is greater than the first preset working voltage. If the output voltage of the second output end of the transformer 16 is greater than the first preset working voltage, the voltage stabilizing circuit 19 is controlled to stop supplying power to the LLC circuit. When the LLC circuit is powered off, the input end of the transformer 16 does not receive the input supply voltage. Thus, the voltage of the second output end of the transformer 16 is reduced, thereby realizing over-voltage protection.

In the display device according to some embodiments of the present disclosure, the over-voltage protection circuit is configured at the second output end of the transformer, to monitor the output voltage of the second output end of the transformer, and control the voltage stabilizing circuit to stop supplying power to the LLC circuit when it determines that the output voltage of the second output end of the transformer is greater than the first preset working voltage. In this way, the transformer is prevented from outputting over-voltage, thereby preventing the display device from working at a voltage above predetermined threshold and increasing reliability of the power source.

Illustratively, based on any one of the above embodiments, the power source assembly 1 further includes a first rectifying filter circuit and a second rectifying filter circuit. The first output end of the transformer 16 is connected with the first end of the voltage stabilizing circuit 19 through the first rectifying filter circuit. The second output end of the transformer 16 is connected with the electric load 2 through the second rectifying filter circuit. A reference may be made to FIG. 7 below.

Figure 7:
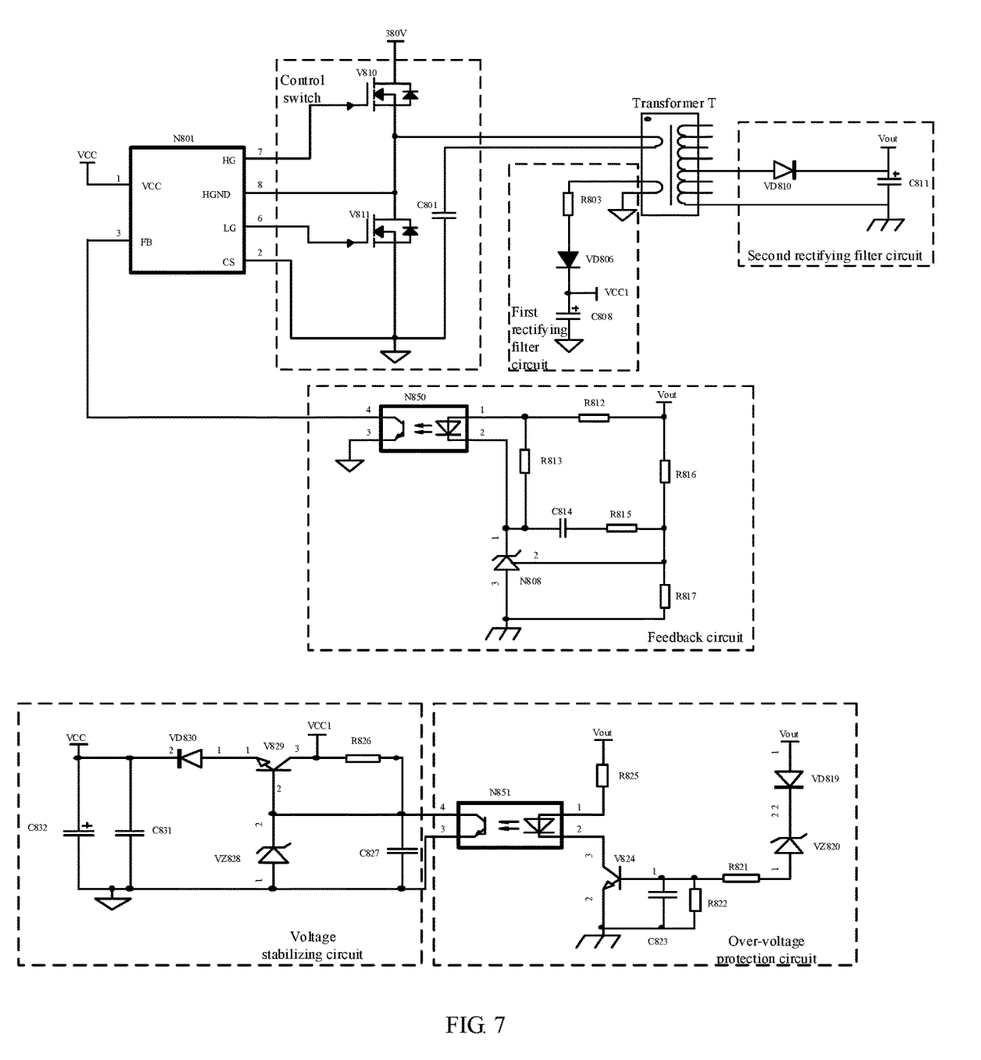
FIG. 7 is a schematic diagram illustrating a structure of a power source assembly of a display device according to a sixth embodiment of the present disclosure.

Illustratively, the structure of the power source assembly in the display device according to the embodiment of FIG. 6 is described below with the LLC circuit 15 adopting a N801 chip shown in the above embodiments. FIG. 7 is a schematic diagram illustrating a structure of a power source assembly of a display device according to a sixth embodiment of the present disclosure. As shown in FIG. 7, the power source assembly includes a N801 chip, a transformer T, a feedback circuit, a control switch, a voltage stabilizing circuit and an over-voltage protection circuit.

Illustratively, an input end of the transformer T is connected with the output voltage (380V) of the PFC component 14 through a switch V810, a switch V811 and a capacitor C801, where the control switch includes the switch V810 and the switch V811. A HG pin and a LG pin of the N801 chip serving as the control ends of the N801 chip are connected with the control ends of the switch V810 and the switch V811 respectively to control the switch V810 and the switch V811 to turn on and off, thereby controlling the transformer T to receive or not receive the output voltage from the PFC component 14. A HGND pin of the N801 chip is connected with the input end of the transformer T through the control switch to constitute an input circuit of the transformer T. A CS pin of the N801 chip is configured to measure a current signal of the input end of the transformer T to adjust phases of the input voltage and the input current of the transformer T. The first output end of the transformer T supplies a voltage VCC1 to the voltage stabilizing circuit through the first rectifying filter circuit. The voltage stabilizing circuit is connected with a VCC pin of the N801 chip to supply a voltage VCC to the VCC pin of the N801 chip. The second output end of the transformer T supplies a voltage Vout to the feedback circuit and the over-voltage protection circuit through the second rectifying filter circuit. The feedback circuit is connected with a FB pin of the N801 chip to ensure the voltage of the second output end of the transformer T is stable. The over-voltage protection circuit is connected with the voltage stabilizing circuit.

In some embodiments, the switch V810 and the switch V811 may be a field effect transistor (MOS transistor).

In some embodiments, the first rectifying filter circuit includes a resistor R803, a diode VD806 and a capacitor C808. The resistor R803 is a current-limiting resistor, the diode VD806 is configured to rectify the voltage supplied by the first output end of the transformer T, and the capacitor C808 is configured to perform filtering for a rectified voltage.

In some embodiments, the second rectifying filter circuit includes a diode VD810 and a capacitor C811. The diode VD810 is configured to rectify the voltage supplied by the second output end of the transformer T, and the capacitor C811 is configured to perform filtering for a rectified voltage.

The feedback circuit includes a resistor R812, a resistor R813, a resistor R815, a resistor R816, a resistor R817, a capacitor C814, a comparator N808 and a photoelectric coupler N850.

The feedback circuit is configured to feed the voltage Vout supplied by the second output end of the transformer T back to the FB pin of the N801 chip in the form of current. The resistor R816 and the resistor R817 form a voltage sampling circuit which takes a connection point of the resistor R816 and the resistor R817 as a sampling point. The sampling point is connected with an input end of the comparator N808. The comparator N808 compares a pre-stored reference voltage, for example, 2.5V, with a voltage of the sampling point to determine a size of a conduction current in the comparator N808 based on a comparison result. The size of the conduction current in the comparator N808 affects sizes of currents in input pins 1 and 2 of the photoelectric coupler N850. Further, the sizes of currents in output pins 3 and 4 of the photoelectric coupler N850 are affected, that is, a size of a current flowing into the FB pin is affected.

Further, the resistor R812 is a current-limiting resistor, and the resistor R813 is a shunt resistor and configured to shunt part of a current in the resistor R812 to the resistor R813. The resistor R815 and the capacitor r C814 constitute a compensation circuit for controlling a response speed of the comparator N808.

In some embodiments, the voltage stabilizing circuit includes a resistor R826, a capacitor C827, a capacitor C831, a capacitor C832, a diode VD830, a triode V829 and a voltage stabilizing diode VZ828.

The resistor R826 is a current-limiting resistor and configured to protect the voltage stabilizing diode VZ828. The capacitor C827, the capacitor C831 and the capacitor C832 are configured to perform filtering. The diode VD830 is configured to prevent VCC backflow when the display device is started.

The voltage stabilizing diode VZ828 is configured to stabilize the voltage of a pin 2 of the triode V829 at a fixed voltage value, for example, 18.7V. According to the characteristics of the triode, a P/N junction voltage difference in the triode V829 is approximately 0.7V, so that a pin 1 of the triode V829 is stabilized at one fixed voltage value, for example, 18V. When VCC1 changes, an excess voltage is applied between a pin 1 and a pin 3 of the triode V829, thereby realizing stable voltage.

The over-voltage protection circuit includes a diode VD819, a voltage stabilizing diode VZ820, a resistor R821, a resistor R822, a resistor R825, a capacitor C823, a triode V824 and a photoelectric coupler N851.

A stabilizing voltage of the voltage stabilizing diode VZ820 is denoted as a first voltage. When the VOUT is greater than the first voltage, the diode VD819 is turned on to control the triode V824 to turn on, so that the photoelectric coupler N851 is turned on. When the photoelectric coupler N851 is turned on, the voltage stabilizing diode VZ 828 in the voltage stabilizing circuit is grounded, so that the triode V829 in the voltage stabilizing circuit is cut off. Finally, the voltage stabilizing circuit is caused not to supply power to the VCC of the N801 chip, and thus the N801 stops working.

Further, the resistor R821 and the resistor R825 are configured to limit currents, and the capacitor C823 and the resistor R822 are configured to perform filtering.

Illustratively, when adjusting the output voltage of the second output end of the transformer T based on the feedback voltage supplied by the feedback circuit, the N801 chip adjusts a working frequency of the N801 chip, so as to adjust the output voltages Vout and VCC1 of the transformer T. The Vout voltage is configured to supply power to the electric load, and the VCC1 voltage is configured to maintain normal operation of the N801 chip. The feedback circuit performs sampling on the Vout voltage and feeds a signal back to the N801 chip, thereby constituting a negative feedback system. The negative feedback system works according to the following principle: when it is detected that the output voltage of the transformer T is reduced, and the feedback current is increased, the working frequency of the N801 chip is reduced, so that the output voltage of the transformer T is increased. At the same time, the over-voltage protection circuit also monitors the Vout voltage. If the Vout voltage is greater than the first preset working voltage, the Vcc supply voltage of the N801 chip is disconnected, thereby realizing output of over-voltage protection. Specifically, when the output voltage of the transformer T increases, the voltage stabilizing diode VZ820 in the over-voltage protection circuit is broken down (in a breakdown mode), the triode V824 is turned on, the pin 2 of the triode V829 in the voltage stabilizing circuit is pulled down to cut off the triode V829, and thus the power supply of the N801 chip is disconnected.

Figure 8:
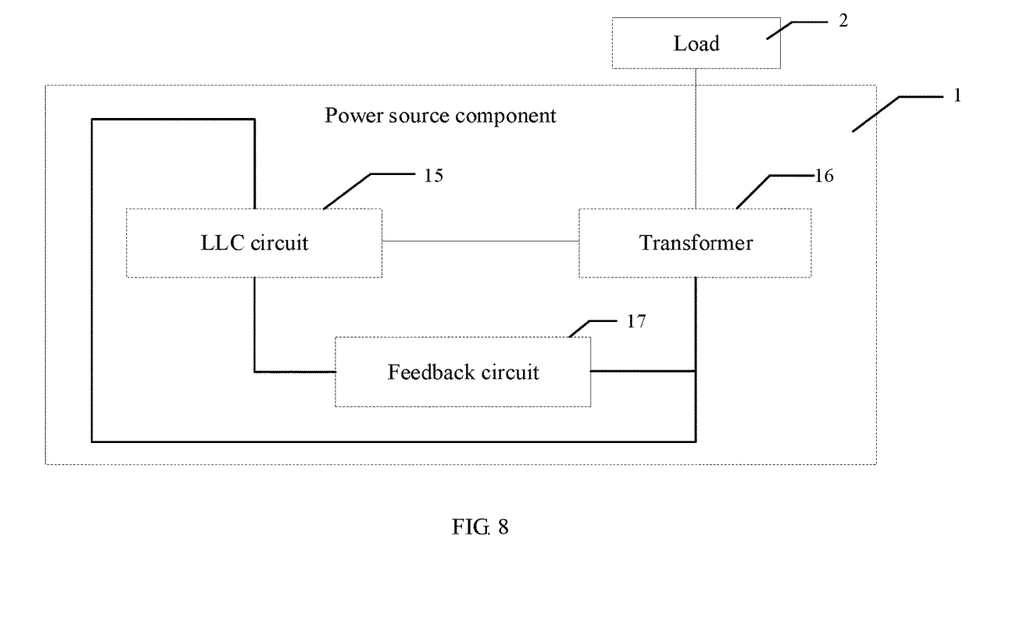
FIG. 8 is a schematic diagram illustrating a structure of a power source assembly of a display device according to a seventh embodiment of the present disclosure.

Illustratively, an embodiment of the present disclosure further provides a display device. FIG. 8 is a schematic diagram illustrating a structure of a power source assembly of a display device according to a seventh embodiment of the present disclosure. The power source assembly 1 in the embodiment includes an LLC circuit 15, a transformer 16, and a feedback circuit 17. The manner of connecting different components in FIG. 8 is different from the manner shown in FIGS. 3-7.

As shown in FIG. 8, the first output end of the transformer 16 is connected with the first end of the feedback circuit 17 and the supply end of the LLC circuit 15. The second end of the feedback circuit 17 is connected with the feedback end of the LLC circuit 15, and the control end of the LLC circuit 15 is connected with the input end of the transformer 16. The LLC circuit 15 is configured to stabilize the voltage supplied by the first output end of the transformer 16 to the LLC circuit 15 based on the feedback voltage supplied by the feedback circuit 17. The second output end of the transformer 16 is connected with the electric load 2 of the display device to supply power to the electric load 2. The first output end and the second output end of the transformer 16 are disposed at the same side of the transformer 16.

In some embodiments, the first output end of the transformer 16 and the second output end of the transformer 16 are both disposed at the same side of the transformer 16, that is, a voltage winding of the first output end of the transformer 16 and a voltage winding of the second output end of the transformer 16 are disposed at the same side of the transformer, and their coupling coefficients are basically the same. Therefore, the first end of the feedback circuit 17 is connected with the first output end of the transformer 16. When the LLC circuit 15 stabilizes the voltage supplied by the first output end of the transformer 16 to the LLC circuit 15 based on the feedback voltage supplied by the feedback circuit 17, a change amount of the second output end of the transformer 16 is basically the same as a change amount of the first output end of transformer 16, resulting in small power loss. In this way, significant change of the second output end of the transformer 16 is avoided and the voltage stabilizing circuit 19 in the embodiments shown in FIGS. 3-7 may be omitted. Thus, the display device in the embodiments is less complex, and the cost for the display device is relatively low while the circuit reliability is relatively high.

In some embodiments of FIG. 8 different from the example of FIG. 4, the feedback circuit 17 is configured to indicate the output voltage supplied by the first output end of the transformer 16 to the LLC circuit 15. In these embodiments, the LLC circuit 15 stores a second preset reference voltage. The output voltage of the first output end of the transformer 16 is adjusted by comparing the voltage supplied by the feedback circuit 17 at the feedback end of the LLC circuit 15 with the second preset reference voltage, so that the voltage of the feedback end is consistent with the second preset reference voltage.

In some embodiments of FIG. 8, similar to the example shown in FIG. 4, when the transformer 16 is in normal operation, the PFC component 14 supplies a voltage of 380V to the input end of the transformer 16 through the control switch 18, and the second output end of the transformer 16 supplies a voltage of 220V to the electric load 2. The voltage supplied by the first output end of the transformer 16 to the supply end of the LLC circuit 15 is 18V and the voltage supplied by the first output end of the transformer 16 to the feedback end of the LLC circuit 15 through the feedback circuit 17 is 12V. In some embodiments, when the output voltage of the second output end of the transformer 16 is reduced from 220V to 210V due to increase of the electric load of the transformer 16, the voltage received by the feedback end of the LLC circuit 15 is reduced to 11.5V. When the LLC circuit 15 increases the output voltage of the second output end of the transformer 16 to 220V through the control switch 18, the voltage supplied by the first output end of the transformer 16 to the supply end of the LLC circuit 15 is increased from 18V to 19V. Compared with the increase amount from 18V to 22V in the example of FIG. 4, the change of the voltage of first output end of the transformer 16 is smaller, resulting in higher stability of power source. Thus, disposal of the voltage stabilizing circuit 19 before the supply end of the LLC circuit 15 may be avoided.

Here, the LLC circuit 15 is further configured to stop operating when the voltage received at the supply end is higher than the second preset working voltage. Illustratively, an over-voltage protection is realized in the LLC circuit and the LLC circuit 15 detects the size of the voltage received at the supply end. If the voltage received at the supply end exceeds a pre-stored reference value, the LLC circuit 15 enters a protection state, for example, stops normal operation. Thus, compared with examples of FIGS. 3-7, a particular over-voltage protection circuit is further omitted in the power source assembly in the embodiments.

In the embodiments, for example, the manner of connecting the control end of the LLC circuit 15 with the primary side of the transformer 16 is same as or similar to the manner shown in FIGS. 3-7 and will not be repeated herein.

In the display device according to some embodiments of the present disclosure, the addition of the voltage stabilizing circuit and the over-voltage protection circuit in the power source assembly is avoided by disposing the first output end and the second output end of the transformer at the same side. Thus, the display device is simpler in structure, and the cost for the display device is relatively low while the circuit reliability is relatively high.

Figure 9:
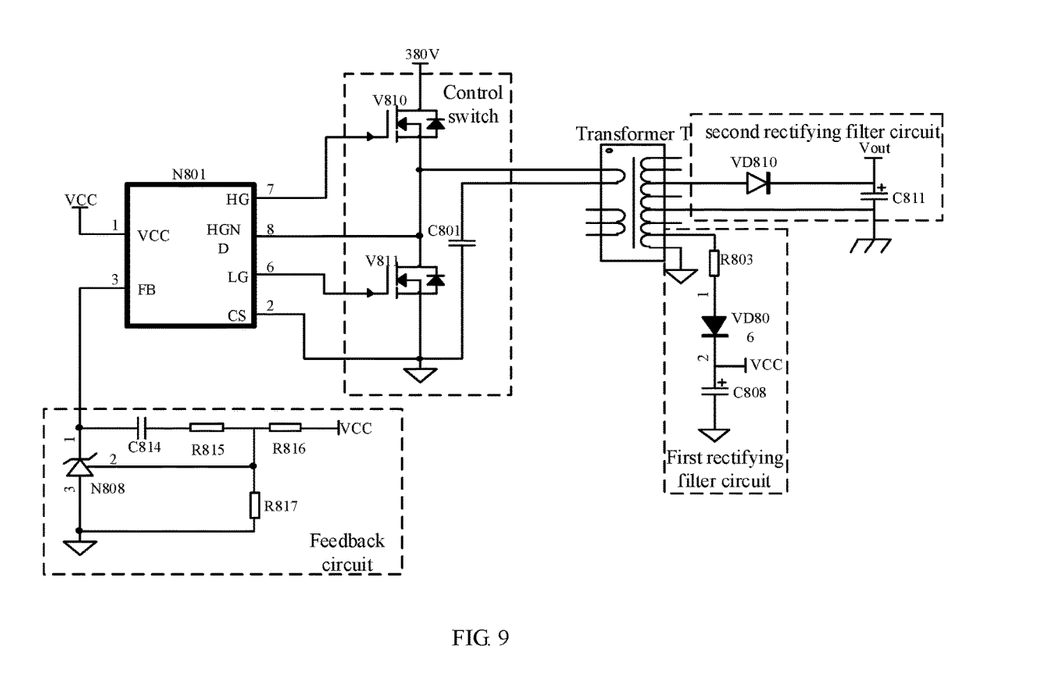
FIG. 9 is a schematic diagram illustrating a structure of a power source assembly of a display device according to an eighth embodiment of the present disclosure.

Illustratively, the structure of the power source assembly in the display device according to the example of FIG. 8 is described below with the LLC circuit adopting the N801 chip. For example, FIG. 9 is a schematic diagram illustrating a structure of a power source assembly of a display device according to an eighth embodiment of the present disclosure. As shown in FIG. 9, the power source assembly includes a N801 chip, a transformer T and a feedback circuit.

Difference from the example of FIG. 7 is that the first output end and the second output end of the transformer T are both disposed at the secondary side of the transformer T, and there is a good safe distance between the first output end and the second output end of the transformer T. The first output end of the transformer T supplies a voltage VCC to the feedback circuit and the VCC pin of the N801 chip through the first rectifying filter circuit, and the feedback circuit is connected with the FB pin of the N801 chip to stabilize the voltage of the first output end of the transformer T.

In some embodiments, the feedback circuit includes a resistor R815, a resistor R816, a resistor R817, a capacitor C814, and a comparator N808.

Illustratively, the resistor R816 and the resistor R817 form a voltage sampling circuit which takes a connection point of the resistor R816 and the resistor R817 as a sampling point. The sampling point is connected with an input end of the comparator N808. The comparator N808 compares a pre-stored reference voltage, for example, 2.5V, with a voltage of the sampling point to determine a size of a conduction current in the comparator N808 based on a comparison result. The size of the conduction current in the comparator N808 affects a size of a current flowing into the FB pin. The resistor R815 and the resistor R816 form a compensation circuit for controlling a response speed of the comparator N808.

In some embodiments, and compared with FIG. 7, the photoelectric coupler N850 is omitted in the feedback circuit because in order to enable the first output end of the transformer T to supply power for the N801 chip, a safety standard wire adopted for the winding corresponding to the first output end of the transformer T has a safety isolation effect. Therefore, when the first output end of the transformer T is connected with the feedback circuit, the photoelectric coupler is omitted in the feedback circuit to simplify the circuit structure and reduce costs.

In some embodiments, the first output end and the second output end of the transformer 16 are both disposed at the primary side of the transformer 16.

In the embodiments, the functions of different pins of N801 chip, the control switches, the first rectifying filter circuit and the second rectifying filter circuit are same as or similar to the example of FIG. 7 and will not be repeated herein.

Figure 10:
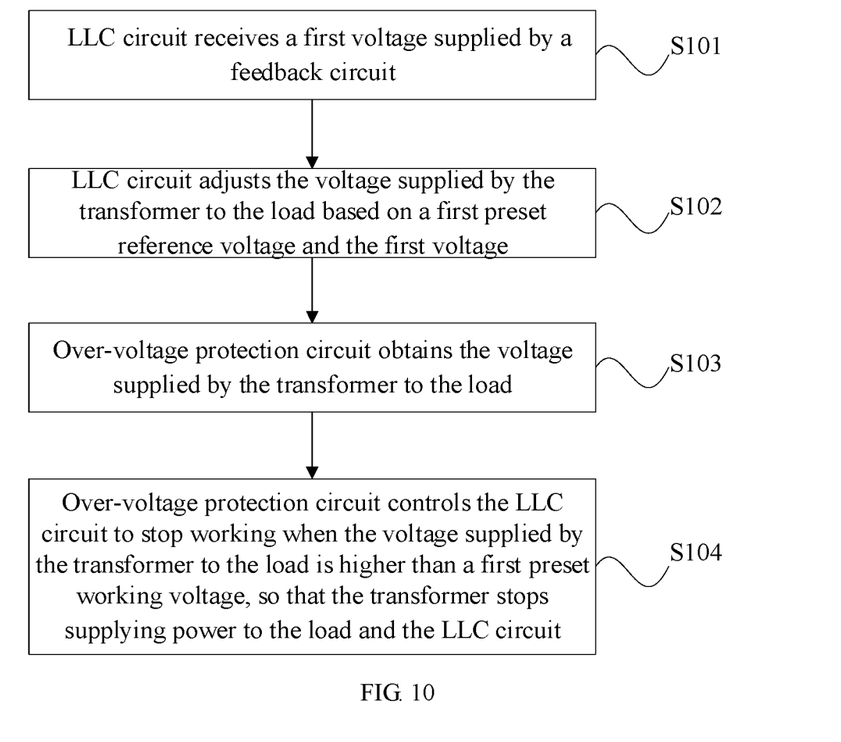
FIG. 10 is a flowchart illustrating an over-voltage protection method according to some exemplary embodiments of the present disclosure.

FIG. 10 is a flowchart illustrating an over-voltage protection circuit according to some embodiments of the present disclosure. As shown in FIG. 10, the method includes the following blocks S101-S104.

At block S101, an LLC circuit receives a first voltage supplied by a feedback circuit.

The first voltage is used to indicate a voltage supplied by a transformer to an electric load. For example, when the voltage supplied by the transformer to the electric load is 220V, the first voltage received by the LLC circuit is 12V.

At block S102, the LLC circuit adjusts the voltage supplied by the transformer to the electric load based on a first preset reference voltage and the first voltage.

For example, when the first voltage received by the LLC circuit is greater than the first preset reference voltage, the voltage supplied by the transformer to the electric load is reduced. When the first voltage received by the LLC circuit is smaller than the first preset reference voltage, the voltage supplied by the transformer to the electric load is increased.

At block S103, an over-voltage protection circuit obtains the voltage supplied by the transformer to the electric load.

At block S104, the over-voltage protection circuit controls the LLC circuit to stop working when the voltage supplied by the transformer to the electric load is higher than a first preset working voltage, so that the transformer stops supplying power to the electric load and the LLC circuit.

Figure 11:
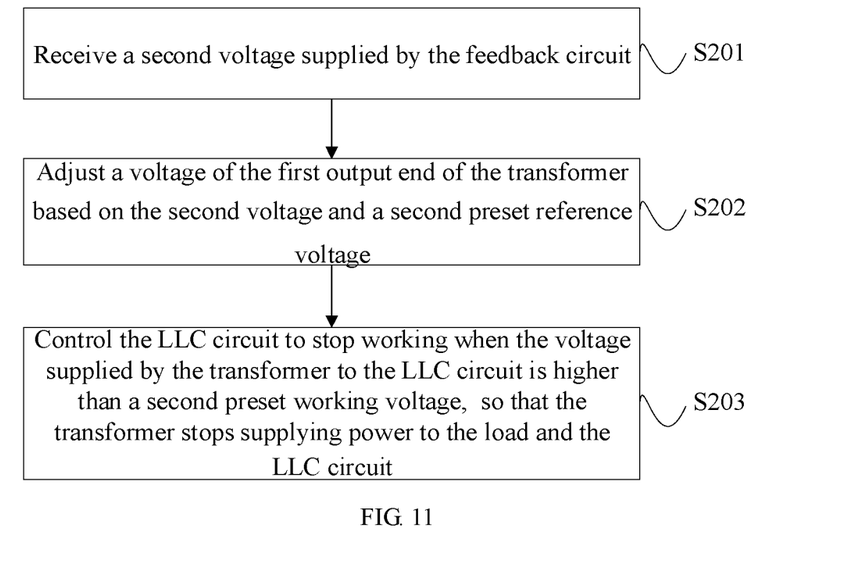
FIG. 11 is a flowchart illustrating another over-voltage protection method according to some exemplary embodiments of the present disclosure.

FIG. 11 is a flowchart illustrating an over-voltage protection method according to some embodiments of the present disclosure. The LLC circuit according to some embodiments may be the LLC circuit 15 shown in the example of FIG. 8. As shown in FIG. 11, the method includes the following blocks S201-S203.

At block S201, a second voltage supplied by the feedback circuit is received.

The second voltage is a second voltage received by the feedback end of the LLC circuit and used to indicate a voltage supplied by the transformer to the LLC circuit. For example, if the voltage supplied by the transformer to the supply end of the LLC circuit is 18V, the second voltage received by the feedback end of the LLC circuit is 12V.

At block S202, a voltage of the first output end of the transformer is adjusted based on the second voltage and a second preset reference voltage.

At block S203, when the voltage supplied by the transformer to the LLC circuit is higher than a second preset working voltage, the LLC circuit is controlled to stop working so that the transformer stops supplying power to the electric load and the LLC circuit.

It is noted that further combinations may be performed based on the above embodiments of the present disclosure to provide more embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A display device, comprising:
an electric load; and
a power source assembly, comprising:
   an LLC circuit, comprising a control end, a supply end, and a feedback end;
   a transformer, comprising an input end, a first output end, and a second output end, wherein the input end is connected with the control end of the LLC circuit, the first output end is connected with the supply end of the LLC circuit, the second output end is connected with the electric load, and the transformer is configured to supply power to the LLC circuit and the electric load;
   a feedback circuit, wherein a first end of the feedback circuit is connected with the second output end of the transformer, a second end of the feedback circuit is connected with the feedback end of the LLC circuit, and the feedback circuit is configured to supply a voltage derived from the second output end of the transformer to the LLC circuit, wherein the LLC circuit is configured to stabilize the voltage supplied by the second output end of the transformer to the electric load based on a feedback voltage supplied by the feedback circuit;

a voltage stabilizing circuit, wherein a first end of the voltage stabilizing circuit is connected with the first output end of the transformer, a second end of the voltage stabilizing circuit is connected with the supply end of the LLC circuit, and the voltage stabilizing circuit is configured to stabilize a voltage supplied by the first output end of the transformer to the LLC circuit; and an over-voltage protection circuit, wherein a first end of the over-voltage protection circuit is connected with the second output end of the transformer, a second end of the over-voltage protection circuit is connected with a control end of the voltage stabilizing circuit, and the over-voltage protection circuit is configured to send a control signal to the control end of the voltage stabilizing circuit to control the voltage stabilizing circuit to stop supplying power to the LLC circuit when the voltage supplied by the second output end of the transformer to the electric load is higher than a first preset working voltage.

2. The display device according to claim 1, wherein the first output end of the transformer is at a primary side of the transformer, and the second output end of the transformer is at a secondary side of the transformer.

3. The display device according to claim 1, further comprising:
a first rectifying filter circuit, wherein the transformer is connected with the voltage stabilizing circuit through the first rectifying filter circuit; and
a second rectifying filter circuit, wherein the transformer is connected with the electric load through the second rectifying filter circuit.

4. The display device according to claim 1, further comprising a control switch, wherein the first output end of the transformer is connected with the supply end of the LLC circuit via the control switch.

5. A display device, comprising:
an electric load; and
a power source assembly, comprising:
an LLC circuit, comprising a control end, a supply end, and a feedback end;
a transformer, comprising an input end, a first output end, and a second output end, wherein the input end is connected with the control end of the LLC circuit, the first output end is connected with the supply end of the LLC circuit, the second output end is connected with the electric load, and the transformer is configured to supply power to the LLC circuit and the electric load; and
a feedback circuit, wherein a first end of the feedback circuit is connected with the first output end of the transformer, a second end of the feedback circuit is connected with the feedback end of the LLC circuit, and the feedback circuit is configured to supply a voltage of the first output end of the transformer to the LLC circuit, wherein:
the LLC circuit is configured to stabilize the voltage supplied by the first output end of the transformer to the LLC circuit based on a feedback voltage supplied by the feedback circuit;
the LLC circuit is further configured to stop operating when the voltage received at the supply end is higher than a second preset working voltage; and
the first output end and the second output end of the transformer are at a same side of the transformer.

6. The display device according to claim 5, wherein the first output end and the second output end of the transformer are at a secondary side of the transformer.

7. The display device according to claim 6, further comprising:
a power source; and
a control switch;
wherein:
a winding at a primary side of the transformer is connected with the power source through the control switch, and the control end of the LLC circuit is connected with a control end of the control switch; and
the LLC circuit is configured to stabilize the voltage supplied by the first output end of the transformer to the LLC circuit by adjusting a conduction time length of the control switch based on the feedback voltage supplied by the feedback circuit.

8. The display device according to claim 5, wherein the first output end and the second output end of the transformer are at a primary side of the transformer.

9. The display device according to claim 5, further comprising:
a first rectifying filter circuit, wherein the first output end of the transformer is connected with the first end of the feedback circuit and the supply end of the LLC circuit through the first rectifying filter circuit respectively; and
a second rectifying filter circuit, wherein the second output end of the transformer is connected with the electric load through the second rectifying filter circuit.

10. The display device according to claim 5, wherein the feedback circuit comprises:
a first resistor;
a first capacitor connected with the first resistor in series;
a comparator; and
a voltage sampling circuit, comprising a second resistor and a third resistor, wherein the comparator and the first resistor is connected with a sampling point between the second resistor and the third resistor.

* * * * *